United States Patent
Dry

(10) Patent No.: US 9,646,441 B2
(45) Date of Patent: May 9, 2017

(54) SHIELDED COMMUNICATIONS SYSTEM

(71) Applicant: Ford Global Technologies, LLC, Dearborn, MI (US)

(72) Inventor: Alan George Dry, Grosse Pointe Woods, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 9 days.

(21) Appl. No.: 14/729,171

(22) Filed: Jun. 3, 2015

(65) Prior Publication Data
US 2016/0358395 A1 Dec. 8, 2016

(51) Int. Cl.
*G07C 9/00* (2006.01)

(52) U.S. Cl.
CPC ............ *G07C 9/00309* (2013.01); *G07C 2009/00325* (2013.01); *G07C 2009/00785* (2013.01); *G07C 2009/00952* (2013.01); *G07C 2209/64* (2013.01)

(58) Field of Classification Search
CPC ...... G07C 9/00309; G07C 2009/00325; G07C 2009/00785; G07C 2009/00952; G07C 2009/00555; G07C 2009/00761; G07C 2209/64; G07C 2009/0019; G07C 2009/00198; G07C 2009/0023; G07C 2009/00238; G07C 2009/00261; G07C 2009/00269; G07C 2009/00277; G07C 2009/00285; G07C 2009/00412; G07C 2009/00753; G07C 9/00119; G07C 9/00174; G07C 9/00658; G07C 2009/00317; G07C 2009/00333; G07C 2009/00341; G07C 2009/00349; G07C 2009/00357; G07C 2009/00365; G07C 2009/0038; G07C 2009/00579; G07C 2009/00587; G07C 2009/00595; G07C 2009/00603; G07C 9/00111; G07C 9/00182; G07C 9/00571; B60R 25/24
See application file for complete search history.

(56) References Cited

U.S. PATENT DOCUMENTS

| | | | | |
|---|---|---|---|---|
| 4,712,398 A | * | 12/1987 | Clarkson | E05B 47/063 361/172 |
| 4,719,460 A | * | 1/1988 | Takeuchi | B60R 25/24 180/287 |
| 4,837,567 A | * | 6/1989 | Kleefeldt | B60R 25/02115 307/10.5 |
| 4,980,680 A | * | 12/1990 | Knoll | B60R 25/045 307/10.3 |
| 5,519,260 A | * | 5/1996 | Washington | B60R 25/04 123/198 DC |

(Continued)

OTHER PUBLICATIONS

Advanced Keys, www.advancdedkeys.com, "Smart Keyless Entry System + Push Button Start Module," Feb. 16, 2015.

*Primary Examiner* — Brian Miller
(74) *Attorney, Agent, or Firm* — Frank A. MacKenzie; Bejin Bieneman PLC

(57) ABSTRACT

A system includes a vehicle receiver and a fob. The fob includes a shield which defines a shield cavity. A transmitter is located with the shield cavity and is programmed to send signals to the vehicle receiver. The shield cavity is shielded to direct signals transmitted by the transmitter toward the vehicle receiver when the fob engages and is pushed toward the vehicle receiver.

15 Claims, 7 Drawing Sheets

(56) References Cited

U.S. PATENT DOCUMENTS

| | | | |
|---|---|---|---|
| 5,539,260 A * | 7/1996 | Khangura | B60R 25/04 180/287 |
| 5,561,420 A * | 10/1996 | Kleefeldt | E05B 77/48 307/10.5 |
| 5,679,984 A * | 10/1997 | Talbot | G07C 9/00309 180/287 |
| 5,684,339 A * | 11/1997 | Treharne | B60R 25/24 180/287 |
| 5,898,231 A * | 4/1999 | Everett | B60R 25/00 180/287 |
| 5,952,937 A * | 9/1999 | Koopman, Jr. | B60R 25/00 307/10.3 |
| 6,326,705 B1 * | 12/2001 | Yano | B60R 25/04 307/10.1 |
| 6,351,206 B1 * | 2/2002 | Schweiger | B60R 25/02118 307/10.3 |
| 6,400,254 B2 * | 6/2002 | Yamamoto | B60R 25/02142 307/10.3 |
| 6,446,049 B1 * | 9/2002 | Janning | A01K 15/023 141/94 |
| 6,744,148 B2 * | 6/2004 | Kees | B60R 25/045 180/237 |
| 6,781,507 B1 * | 8/2004 | Birchfield | B60R 25/209 340/10.1 |
| 6,819,229 B2 * | 11/2004 | Ghabra | B60R 25/24 307/10.3 |
| 6,828,901 B2 * | 12/2004 | Birchfield | B60R 25/209 307/10.5 |
| 7,023,318 B1 * | 4/2006 | Geiger | B60R 25/04 340/5.31 |
| 7,064,651 B2 * | 6/2006 | Goetz | B60R 25/24 307/10.3 |
| 7,081,806 B2 * | 7/2006 | Koike | G06Q 20/341 340/5.23 |
| 7,592,895 B2 | 9/2009 | Tang | |
| 8,022,808 B2 | 9/2011 | Kurpinski | |
| 8,055,184 B1 * | 11/2011 | DiMartino | G06Q 20/40 235/380 |
| 8,249,935 B1 * | 8/2012 | DiMartino | G06Q 20/204 705/16 |
| 8,638,202 B2 | 1/2014 | Oesterling | |
| 8,719,102 B1 * | 5/2014 | DiMartino | G06Q 20/204 705/16 |
| 8,907,760 B2 | 12/2014 | Nowottnick | |
| 9,041,510 B2 * | 5/2015 | Wolski | G07C 9/00309 340/5.6 |
| 9,184,598 B2 * | 11/2015 | Colja | H02J 7/042 |
| 2007/0145152 A1 * | 6/2007 | Jogand-Coulomb | G06K 7/10237 235/492 |
| 2009/0165512 A1 * | 7/2009 | Bellamy | E05B 47/0011 70/278.3 |
| 2011/0006112 A1 * | 1/2011 | Mueller | G06K 7/082 235/379 |
| 2012/0011367 A1 * | 1/2012 | Denison | G07C 9/00571 713/170 |
| 2012/0268242 A1 | 10/2012 | Tieman | |
| 2015/0279186 A1 * | 10/2015 | Chen | A61B 5/150358 340/539.1 |

* cited by examiner

SHIELDED COMMUNICATIONS SYSTEM

BACKGROUND

Keyless entry systems permit operators to control some applications of a vehicle by sending signals to the vehicle from a communications device. Operators may, for example, lock or unlock a vehicle remotely. Vehicle operators appreciate the convenience of controlling the vehicle remotely, and being able to enter a vehicle without fumbling to get a key into a key slot.

DESCRIPTION

Introduction

Keyless entry systems offer great convenience to vehicle operators. However, sometimes people can intercept the signals transmitted from the communications device to the vehicle and gain access to the vehicle. A shielded communications system that solves that problem includes a remote device (hereinafter fob) and a communications unit in the vehicle. The vehicle communications unit includes a receiver. The fob includes a shield cavity, and a transmitter disposed within the shield cavity. The transmitter is configured to transmit messages to the vehicle communications unit receiver. When held against the vehicle at the location of the receiver, the shield cavity of the fob, together with an external surface of the vehicle, form a barrier shielding the message from being intercepted and protecting entry codes from being deciphered and used for unauthorized entry into the vehicle. The shielded communications system may be, for example, an optical communications system.

The fob and vehicle may further support, e.g., radio frequency based communications for control of other vehicle applications, such as locking the vehicle, turning on the ignition, etc.

System Elements

Figure 1:
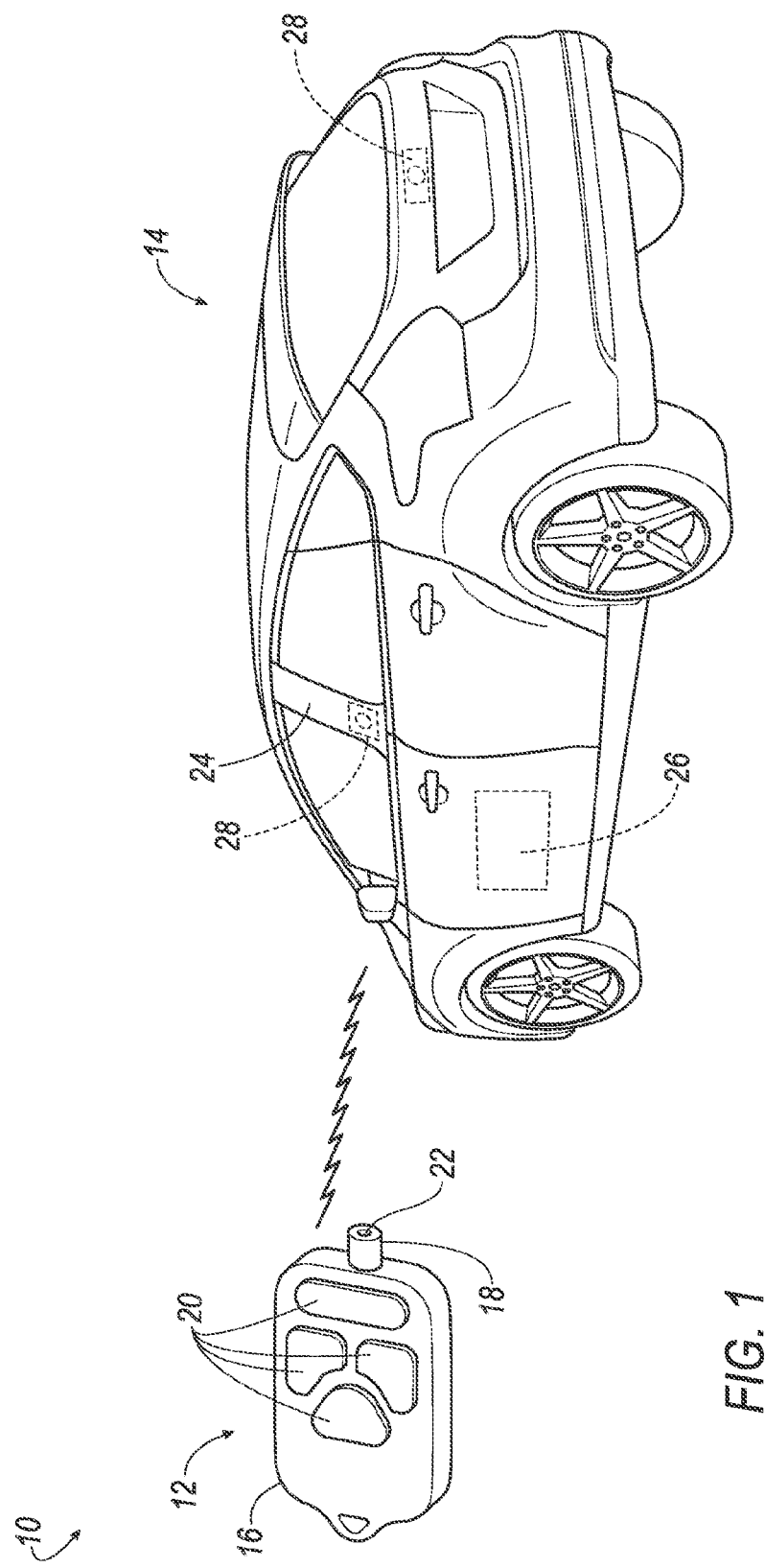
FIG. 1 is a diagram of an example shielded communications system.

FIG. 1 illustrates a shielded communications system 10 for a vehicle 14. The system 10 provides for remote control from a fob 12 of vehicle 14 applications. Two communication systems are provided between the fob 12 and the vehicle 14. A first communication system is provided for control of applications such as lights, climate control and ignition not associated with vehicle entry. A second communication system is provided for vehicle entry applications such as unlocking the doors.

As shown in FIG. 1, the fob 12 includes a case 16, a shield 18 extending from the case 16 and an interface 20 for receiving inputs from a user. The shield 18 defines a shield cavity 22. As described below, the shield cavity 22 may provide a shielded communication path between the fob 12 and the vehicle 14.

The vehicle 14 includes B-pillars 24 on a driver's side (FIG. 1) and a passenger's side (not shown). The vehicle 14 further includes a first communications unit 26 and a second communications unit 28 for communicating with the fob 12. The first communications unit 26 may be, e.g., dedicated to receiving messages for controlling vehicle applications not related to vehicle entry such as lights, climate control and ignition applications. The first communications unit 26 may be, e.g., a radio frequency (RF) communications unit and may be able to receive messages from the fob 12 from locations remote to the vehicle 14. For example, the first communications unit 26 may have a range of five meters for receiving signals from the fob 12.

The second communications unit 28 may include any electronic device programmed to, e.g., unlock vehicle doors in response to a command received from a remote device such as the fob 12. As shown in FIG. 1, the second communications unit 28, or a portion of the second communications unit 28 used for receiving transmissions from the fob 12, may be located, e.g., on the B-pillar 24 on the driver's side of the vehicle 14. Additionally or alternatively, the second communications device 28 may be located, e.g., on or near a rear hatch door, to allow entry to the rear hatch area, e.g., by a user with an armful of packages. Although discussed in the example below with respect to a location on the B-pillar 24, the second communications unit 28 may be located anywhere in the vehicle 14, and may be used to provide entry to the vehicle 14 via any particular door or combination of doors.

The second communications unit 28 may include, e.g., an optical receiver component that includes, e.g., one or more photodiodes for receiving messages from the fob 12, and in some cases, an optical transmitter component, e.g., one or more light emitting diodes (LEDs) for transmitting messages to the fob 12.

Figure 2:
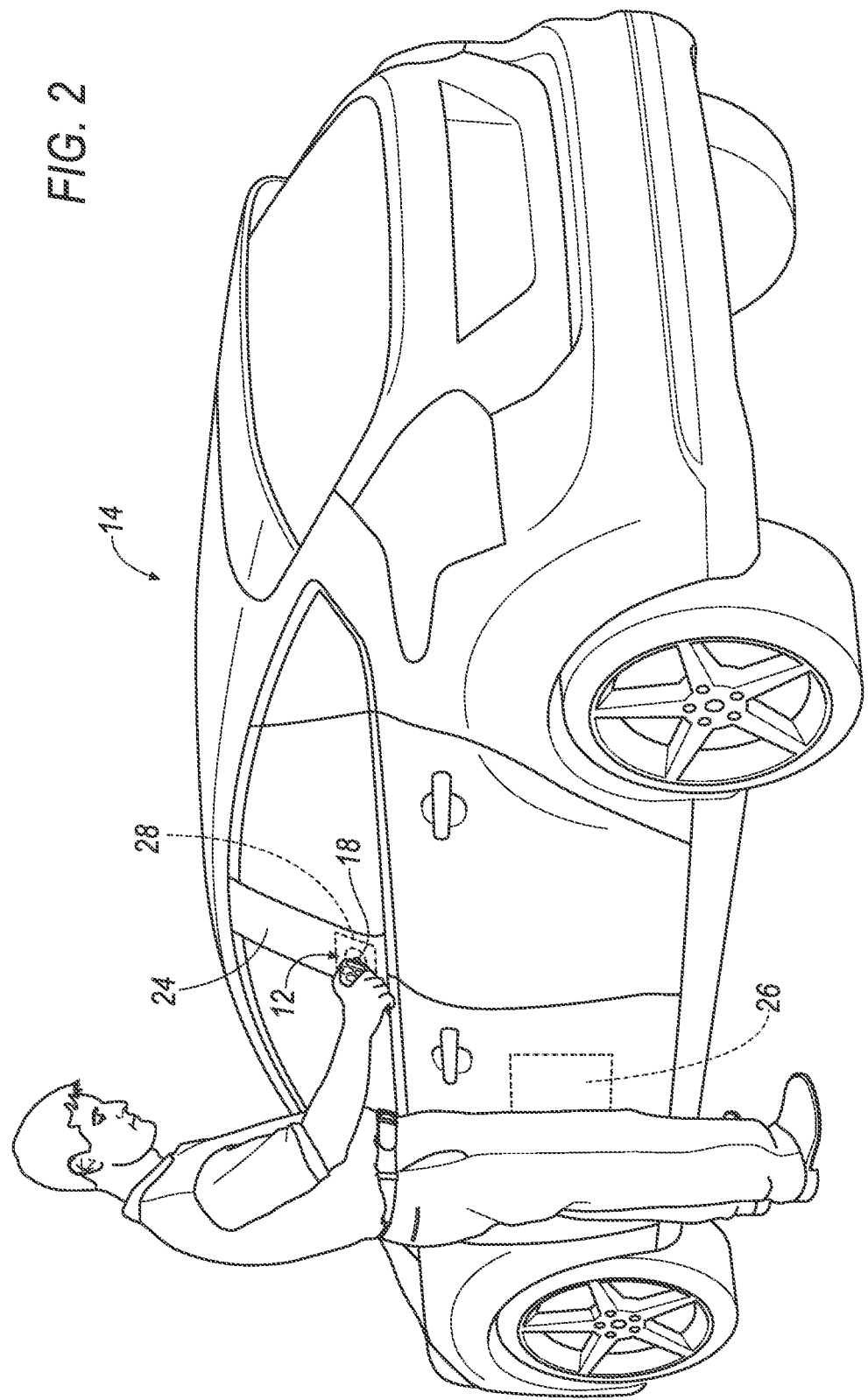
FIG. 2 is a diagram of the example shielded communications system of FIG. 1, showing a fob contacting a vehicle.

The fob 12 may be configured for shielded communications with the second communications unit 28. As shown in FIG. 2, the fob 12 may be held in place with the shield 18 touching the B-pillar 24 of the vehicle 14 at a location of the second communications unit 28. As described further below, the fob 12 may, e.g. via an optical transmitter component within the shield 18, transmit messages to the vehicle 14 second communications unit 28. The fob 12 may further, in some cases, receive optical transmissions from the vehicle 14 second communications system 28.

Figure 3:
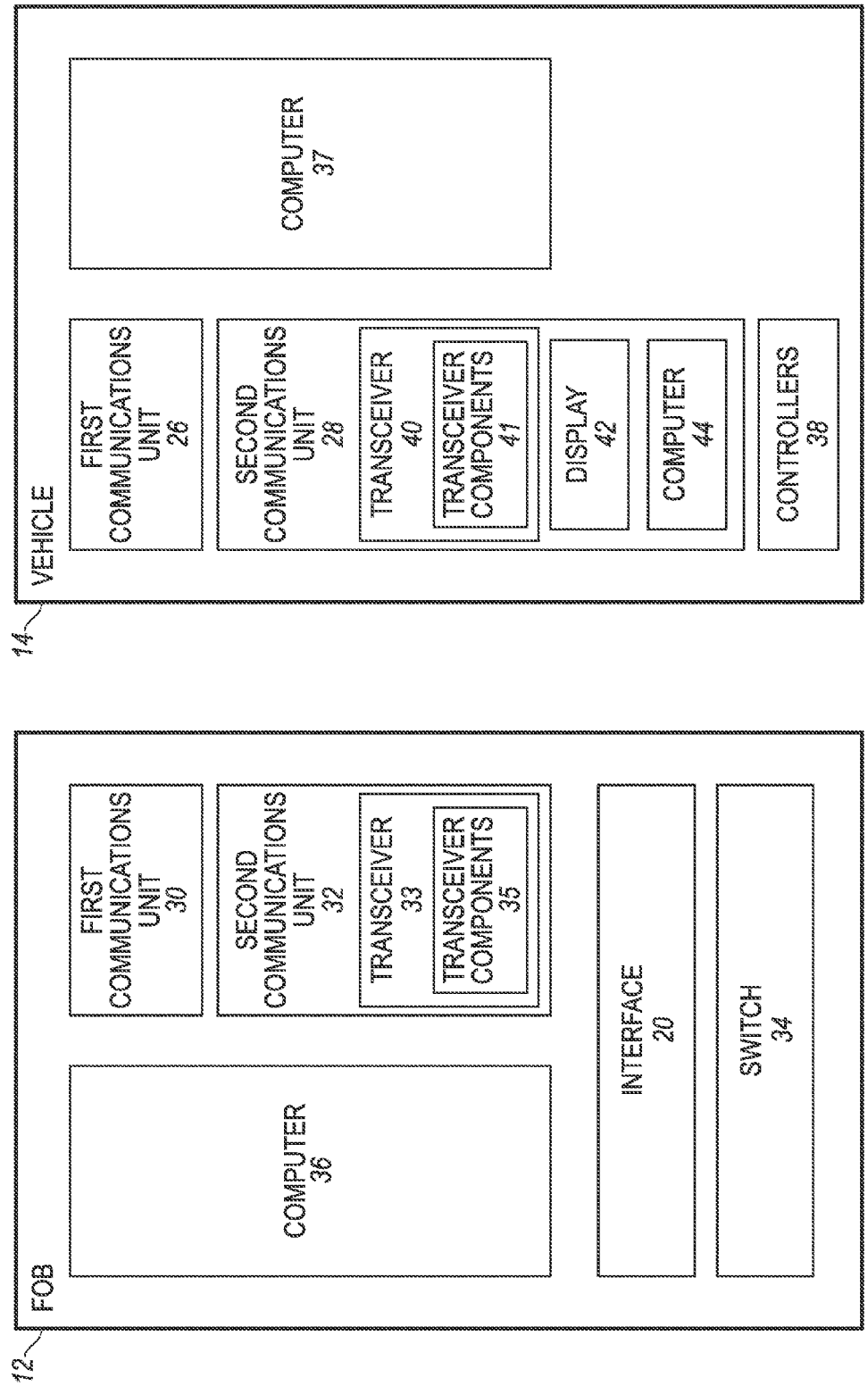
FIG. 3 is a block diagram of an example shielded communications system.

Now referring to FIG. 3, the fob 12 may include a computer 36 communicatively coupled with a first communications unit 30, a second communications unit 32, an interface 20 and a switch 34.

The computer 36 includes a memory and a processor configured to execute programs stored in the memory and to control various functions of the fob 12, e.g., transmitting messages to the vehicle 14, receiving messages from the vehicle 14, etc. The computer 36 may be programmed to, e.g., receive input from the interface 20 or switch 34, and based on the input, send messages to the vehicle 14 via one or both of the first and second communications units 30, 32. The computer 36 may be programmed to select between the first and second communications units 30, 32, based, e.g., on the type of message to be sent. For example, the computer 36 may send messages related to vehicle non-entry applications via the first communications unit 30 and messages related to vehicle entry applications via the second communications unit 32. Further, the computer 36 may, e.g., only send messages via the second communications unit 32 when enabled by the switch 34.

As discussed above, the fob 12 includes an interface 20 for receiving input from and providing output to a user, such as the user of vehicle 14. The interface 20 includes one or more input devices and may include a display. The input devices may be buttons, a touch screen display, a gesture sensing device, etc., for receiving input from the user. The display may include an LCD display, LED display, buzzers, speakers, haptic feedback, etc., for providing information to the user.

The first communications unit 30 may be a radio frequency (RF) communications unit 30 for remote control of vehicle 14 applications. The first communications unit 30, may, e.g., based on commands received from the fob 12 computer 36, transmit messages to the vehicle 14 related to the control of various vehicle 14 applications. For example, the first communications unit 30 may, based on a command received from the computer 36, send a message to the vehicle 14 commanding the vehicle 14 to start the vehicle 14 (activate the ignition), lock the vehicle 14 doors, turn on or off the lights, etc.

The first communications unit 30 may include a receiver for receiving messages from the vehicle 14. Further, the first communications unit 30 may include a passive response system that provides an indication to the vehicle 14 of the distance (range) of the fob 12 from the vehicle 14. The passive response system may be, e.g., a system that is configured to receive signals from the vehicle 14 within a specific range, for example one meter, and send a response to the vehicle 14. The range may be set, as one example, by a strength of a signal sent from the vehicle 14 to the fob 12, and a sensitivity of a receiver for the passive response system in the fob 12.

The second communications unit 32 may be a dedicated communications unit 32 for commands related to vehicle 14 entry applications such as unlocking one or more vehicle 14 doors. As with the first communications system 30, the second communications system 32 may be configured to receive commands from the fob 12 computer 36 and to transmit messages to the vehicle 14 based on the commands. The second communications unit 32 may further be equipped for two-way communications, and may include a receiver for receiving messages from the vehicle 14, and sending them to the fob 12 computer 36.

The second communications unit 32 may be configured for shielded communications with the vehicle 14. For example, the second communications unit 32 may include a transceiver 33. The transceiver 33 may be configured for optical communications and may include one or more transceiver components 35 for transmitting and/or receiving radiated transmissions. The transceiver components 35 may include one or more optical transmitters 35 such as a light emitting diode (LED). The transceiver components 35 may further include one or more optical receivers 35 such as a photodiode. The system may operate in one or more light spectrums, e.g., infrared, visible, ultraviolet, etc. As described below, the transceiver components 35 may be disposed in a shield cavity 22 within the shield 18. The shield 18, together with a surface of the vehicle 14, may form a barrier shielding transmitted signals from interception.

The fob 12 may further include a switch 34 which may be used to activate or enable the second communications unit 32. The switch 34 may, e.g., disable the second communications unit 32 in a first position, and enable the second communications unit 32 in a second position. As described below, the switch 34 may change from the first position to the second position when the shield 18 is pushed into the base 16 of the fob 12.

The vehicle 14 includes a computer 37 communicatively coupled to a first communications unit 26, a second communications unit 28 and one or more controllers 38. The computer 37 includes a memory and a processor programmed to execute programs stored in the memory.

Communication between the computer 37, the first and second communications units 26, 28, the controllers 38, etc. may be conducted over a network bus, for example on a CAN (Controller Area Network) bus, or other wired or wireless mechanisms. The computer 37 may include one or more processors. In the case that the computer 37 includes more than one processor, communication between the processors may also be conducted over a network bus. In addition, the computer 37 may be configured for communicating with other devices via various wired and/or networking technologies, e.g., cellular, Bluetooth®, a universal serial bus (USB), wired and/or wireless packet networks, etc.

The controllers 38 may control various functions of the vehicle 14 such as door locks, a trunk latch, interior/exterior lighting, climate control, engine start, etc. Each controller 38 may have a processor for receiving instructions from the computer 37 and controlling an actuator. For example, a door lock controller 38 may include a processor and a motor (or solenoid) for opening/closing a door lock. Further, the controllers 38 may be able to send messages to the computer 37. For example, the door lock controller 38 may send a signal to the computer 37 that a door has been locked.

The first communications unit 26 may include one or more communications devices for radio frequency (RF) communications with the fob 12, as is known. For example, the communications device may include a transceiver for receiving messages from and transmitting messages to the first communications unit 30 of fob 12. The messages may be related to vehicle non-entry related applications.

Additionally or alternatively, the first communications unit 26 may include a communications device for determining a proximity of a fob 12 to the vehicle 14. For example, the first communications unit 26 may include a transmitter configured to transmit a signal at a predetermined strength and a receiver configured to listen for a response from the fob 12. The predetermined strength may be selected to limit the range of the transmission to a distance of, e.g., one meter. The computer 37 may instruct the first communications unit 26 to transmit the proximity signal to the fob 12. Upon receiving a response, the computer 37 may determine that the fob 12 is near (e.g., within one meter) to the vehicle 14.

Still referring to FIG. 3, the second communications unit 28 includes computer 44 communicatively coupled to a transceiver 40 and a display 42. The second communications unit 28 may receive messages from the fob 12, and provide the messages to the vehicle 14 computer 37. In some cases, the second communications unit 28 may further may be configured to transmit messages to the fob 12.

The computer 44 may be communicatively coupled with the vehicle 14 computer 37 and configured to control the transceiver 40 and display 42 based on commands from the vehicle computer 37. For example, the computer 44 may, based on a command received from the computer 37, activate the display 42 and/or configure the transceiver 40 to receive a message from the fob 12.

The transceiver 40 may include one or more transceiver components 41 and may be configured for one-way or two-way communications. The transceiver components 41 may include, e.g., one or more optical receivers 41, e.g., photodiodes for receiving messages from the fob 12. Additionally, in the case that the transceiver 40 is configured for two-way communications, the transceiver components 41 may include, e.g., one or more optical transmitters 41, e.g., light emitting diodes (LEDs) for transmitting signals to the fob 12. The transceiver components 41 may be selected to operate at wavelengths of radiation corresponding to the wavelengths of operation of the transceiver components 35 of the fob 12.

The display 42 may be, for example, a plurality of LEDs operating in the visible spectrum and may be utilized to indicate a target area 65 (FIGS. 5 and 6) for connecting to the vehicle 14 to establish shielded communications.

For example, the display 42 may generally be turned off. As described above, the computer 37 may be programmed to determine whether the fob 12 is near the vehicle 14. The computer 37 may be further programmed, upon determining that the fob 12 is near the vehicle 14, to turn on the display 42. The display 42 may illuminate a target area 65 for connecting the fob 12 to the vehicle 14. The computer 37 may further command the second communications unit 28 to configure the transceiver 40 to receive one or more messages from the fob 12. Upon receiving a message from the fob 12 to unlock a door of the vehicle 14, the computer 37 may send a command to a controller 38 to unlock the door. After completing the unlock process, the computer 37 may further, e.g., turn-off the display 42 and the transceiver 40.

Figure 4A:
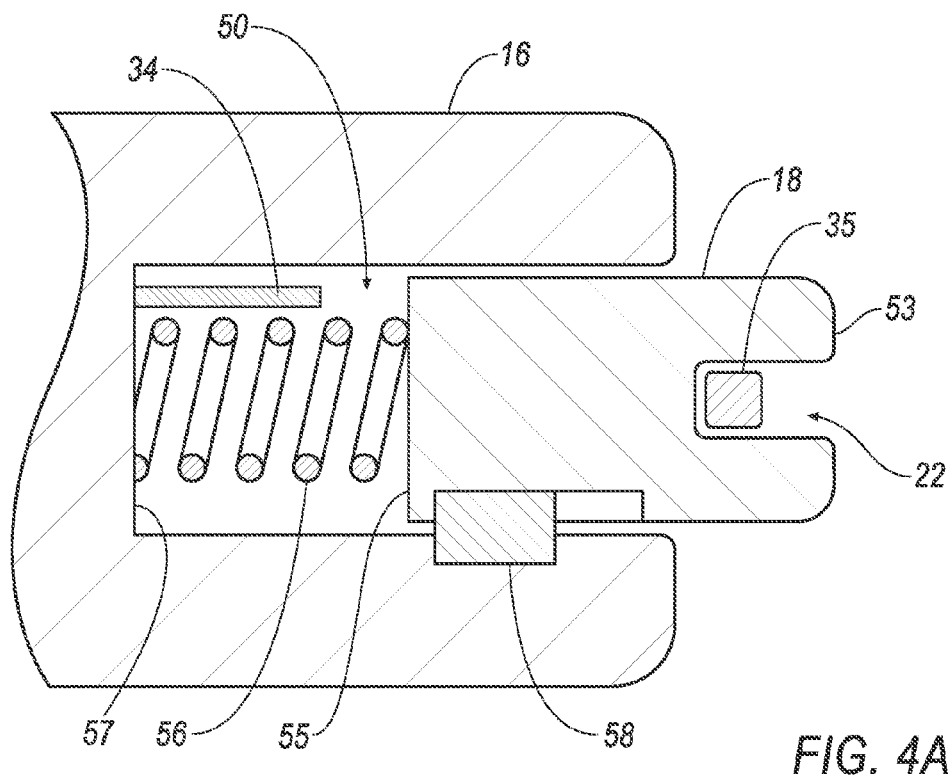
FIG. 4A is a cross-sectional view of an example fob for the shielded communications system in a first "off" position.
Figure 4B:
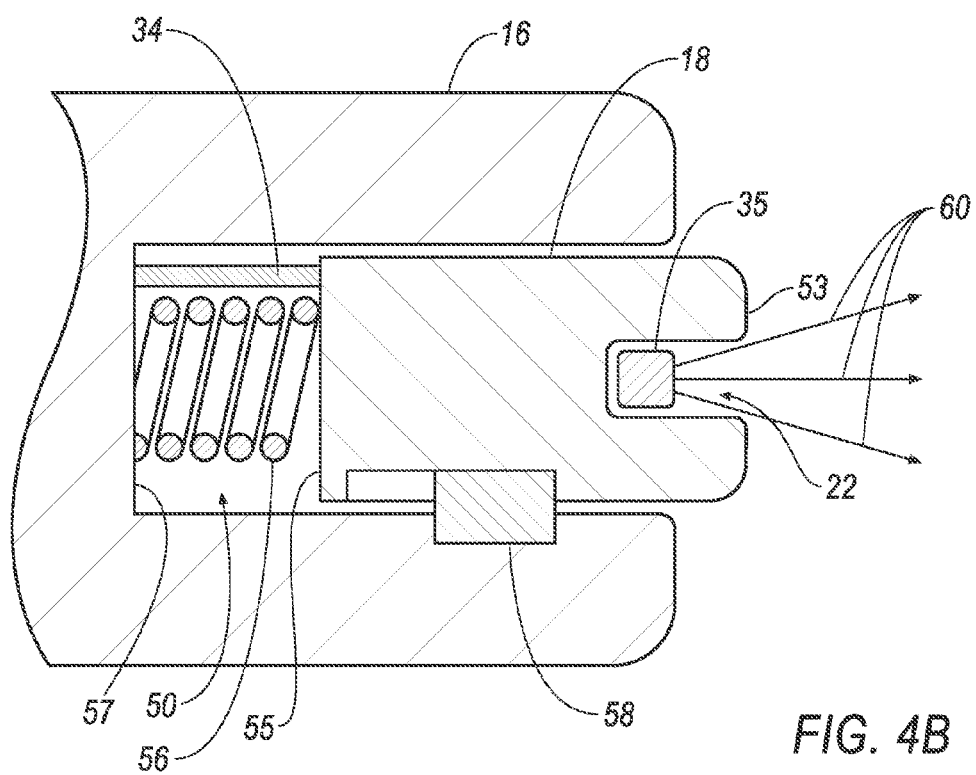
FIG. 4B is a cross-sectional view of an example fob for the shielded communications system in a second "on" position.

FIGS. 4A, 4B show a cross section of the example fob 12 in the shielded communications system 10. As discussed above, the fob 12 includes the case 16. The case 16 may form a cavity 50 for receiving the shield 18. The cavity 50 may be, e.g., cylindrical.

The shield 18 may be generally cylindrical with a first end 53 and a second end 55. The shield 18 may be configured such that the outer dimensions of the shield 18 fit within the cavity 50. The shield may additionally form a shield cavity 22 opening towards the center of the first end 53. Inner surfaces of the shield 18 defining the shield cavity 22 may direct signals transmitted by the transceiver components 35 toward the first end 53 opening.

The shield 18 may be slidably supported within the base 16 cavity 50. A spring 56 may connect the second end 55 of the shield 18 with an inner lateral surface 57 of the cavity 50. The spring 56 may be compressed when the shield 18 is pushed into the cavity 18, and urge the shield 18 outward when the shield 18 is released.

A two position click mechanism 58 may be provided that provides a tactile feedback and/or an audible click indicating to the user that the shield 18 has been moved into one of a first position and a second position. A first, extended position is shown in FIG. 4A. In the first, extended position, the shield 18 may be spaced away from the switch 34. A second, non-extended position is shown in FIG. 4B. In the second, non-extended position, the shield 18 may activate the switch 34. When the shield 18 is pushed in from the first position to the second, non-extended position, as shown in FIG. 4B, the click mechanism 58 may generate a tactile response and/or audible click, indicating to the user that the shield 18 is in the second position and may activate the switch 34. When the shield 18 is released, the click mechanism may generate an additional tactile response and/or audible click to indicate that the shield 18 has returned to the first, extended position of FIG. 4A and may be spaced away from, and no longer activating the switch 34.

One or more transceiver elements 35 may be disposed in the shield cavity 22. The transceiver components 35 may include one or more optical transmitters 35 as described above. As shown in FIG. 4B, radiation 60 from the light radiating element 35 may radiate through the cavity 22 and outward from the first end 53 of the fob 12. As further shown in FIG. 4B, the radiation may radiate, e.g., in a conical pattern, covering a wider area the further the radiation is from the first end 53 of fob 12.

The optical transmitter 35 may be controlled by the fob 12 second communication unit 32 to transmit messages to the vehicle 14. The messages may be transmitted as digital values, according to, e.g., a pulse width modulation coding method.

The fob 12 may further include a switch 34. The switch 34 may be disposed within the cavity 50, such that the switch 34 is actuated when the shield 18 is pushed into the cavity 50. The switch 34 may be used, as described above, to activate or enable the shield 18 when the shield 18 is pushed sufficiently into the cavity 50. The switch 34 may be, for example, a button that is activated by the shield 18 when the shield 18 is pushed into the cavity 50. As another example, the switch 34 may be activated by, e.g., a metal strip disposed on the shield 18 which may make a connection between two metal connectors formed on the inner surface of the cavity 50 when the shield 18 is pushed into the cavity 50.

Figure 5:
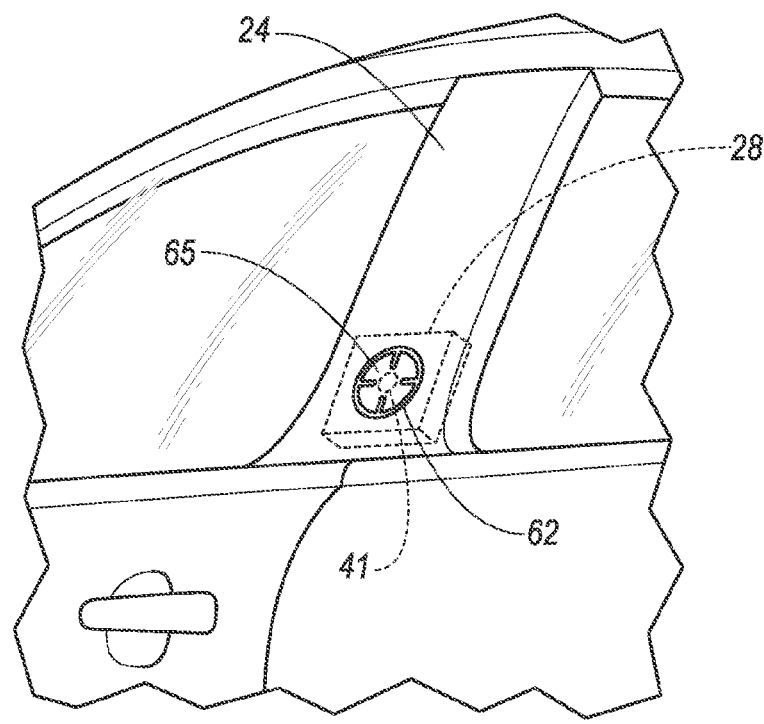
FIG. 5 is a perspective sectional view of a vehicle including an example communications unit disposed on a B-pillar.

The vehicle 14 includes the second communication unit 28 to receive the signals transmitted from the fob 12 second communication unit 32. As shown in FIG. 5, the second communications unit 28 may be disposed on the vehicle 12 B-pillar 24, inside an outer surface of the B-pillar. The outer surface of the B-pillar 24 may be formed, e.g., from a dark, translucent material, such that, without illumination (i.e., when the display 62 is turned-off) the second communication unit 28 cannot be seen from outside of the vehicle 14.

The second communications unit 28 includes a transceiver 40. The transceiver 40 includes transceiver components 41, of which one may be an optical receiver 41. The optical receiver 41 may include, for example, one or more photodiodes with a sensitivity to radiation in a range that matches the wavelength of radiation from the optical transmitters 35 of the fob 12. As shown in FIG. 5, the optical receiver 41 may be disposed in a central portion of the second communications unit 28. In the case that the second communications unit 28 is configured for two-way communications, the one or more transceiver components 41 may also include one or more optical transmitters 41, such as a light emitting diode (LED).

Figure 6:
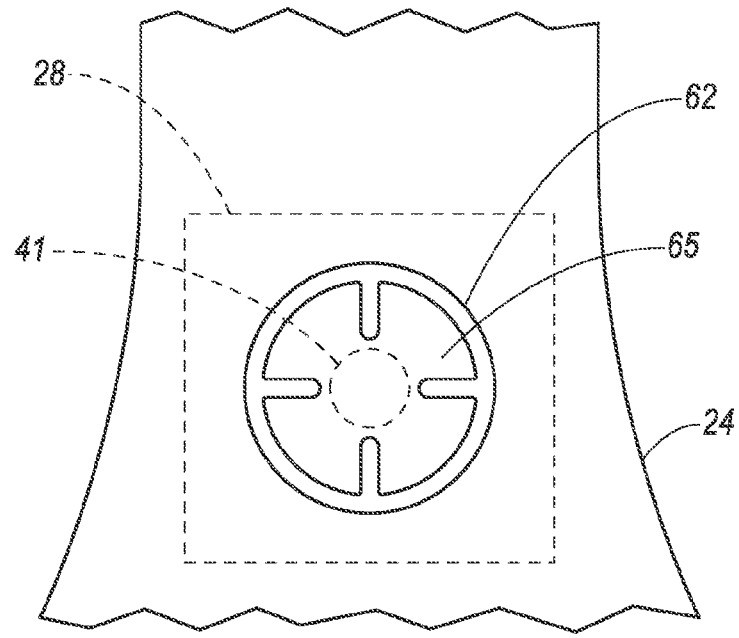
FIG. 6 is front view of an example communications unit illustrating a display and transceiver component.

As further shown in FIGS. 5 and 6, the second communications unit 28 may also include a display 62. The display 62 may include, e.g., a plurality of LEDs and may be used to illuminate a target area 65 surrounding the transceiver elements 41. The LEDs may, for example, be arranged in a ring with additional radial sections extending toward a center of the ring. The target area 65 may be defined as an area inside the ring. The display 62 may be disposed such that the transceiver elements 41 are located at the center of the defined target area 65.

The display 62 may be activated by, e.g., the computer 37, to illuminate the target area 65 when the vehicle 14 detects that an authorized fob 12 is near the vehicle 14. For example, the vehicle 14 may be equipped with a proximity detection system as described above. The vehicle 14 may transmit signals to fobs 12, and listen for responses. In the event that the vehicle 14 receives a response from an authorized fob 12, the vehicle 14 computer 37 may send a command to the second communications unit 32 to illuminate the display 62. In this manner, the display 62 may provide the user of the fob 12 with a visual cue indicating where the user should connect the fob 12 to the vehicle 14.

Figure 7:
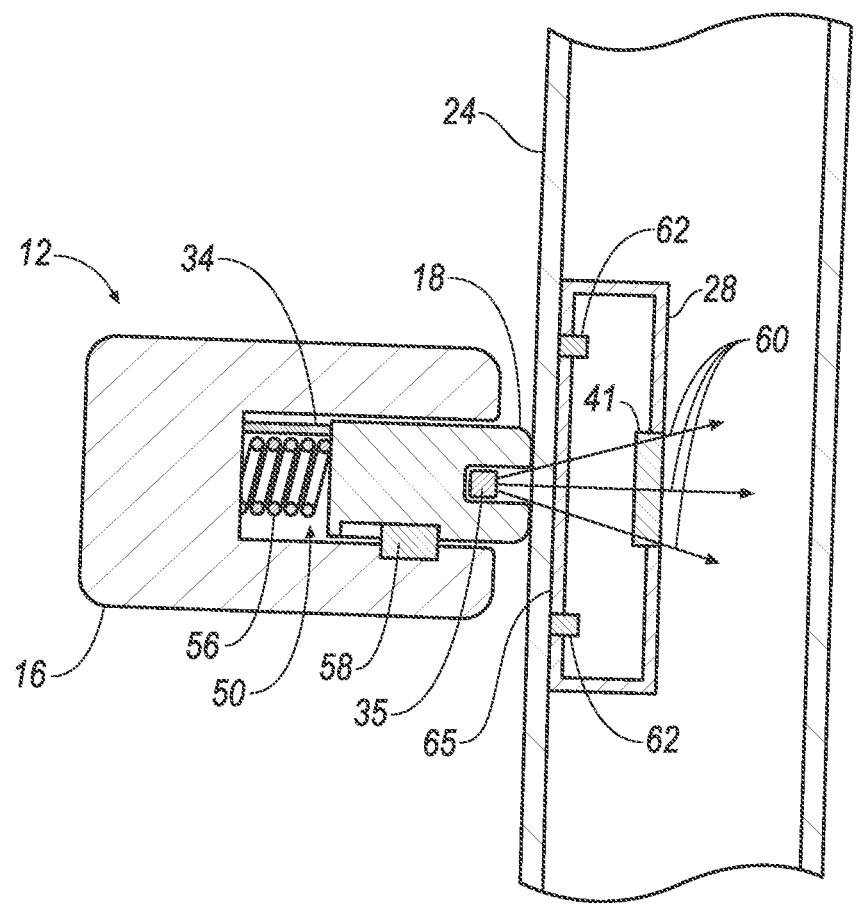
FIG. 7 is a cross-sectional view showing an example fob contacting the B-pillar at the location of the example communications unit.

FIG. 7 illustrates a fob 12 transmitting a message to the vehicle 14 second communications system 28. The fob 12 shield 18 is held against the B-pillar 24 at the target area 65 within the ring formed by the display 62. The shield 18 is pushed into cavity 50 such that the second end 55 of the shield 18 activates the switch 34. The switch 34 may, upon being activated, enable the fob 12 second communications unit 32, which may transmit a message via transceiver component 35 to the vehicle 14. The vehicle 14 transceiver component 41 may receive the message.

The example shown in FIG. 7 illustrates one-way communication from the fob 12 to the vehicle 14. In other cases, two-way communication may be used. In this case, the fob 12 transceiver element 35 may include both an optical transmitter 35 and an optical receiver 35. Similarly, the vehicle 14 transceiver component 41 may include both an optical transmitter 41 and an optical receiver 41. Such an arrangement would provide for a handshake operation to be performed prior to the transmission of an unlock signal.

For example, upon holding the fob 12 against the B-pillar 24, the fob 12 may send a message to the vehicle 14 identifying the fob 12. The vehicle 14 may compare the identification of the fob 12 with a list of authorized fobs. Upon determining that the fob 12 is an authorized fob, the vehicle 14 may respond and indicate the fob 12 is authorized to transmit an unlock code. The fob 12 may then transmit an unlock code. In this manner, a unlock code may only be transmitted after a fob 12 has been confirmed as an authorized fob 12.

Process for Sending Shielded Messages from a Fob to a Vehicle

Figure 8:
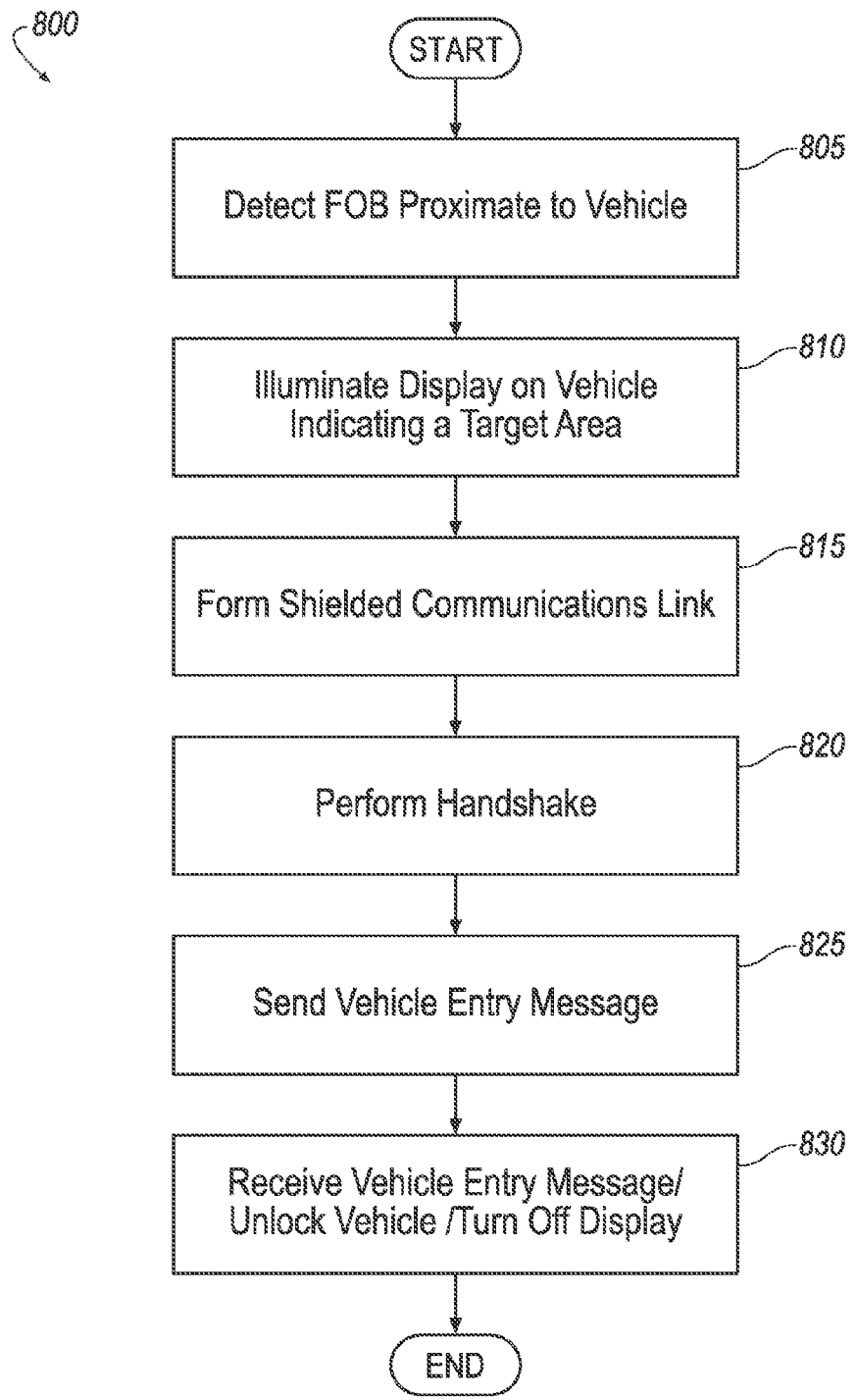
FIG. 8 is a diagram of an example process for transmitting a shielded message from the fob to the vehicle.

FIG. 8 is a diagram of an example process 800 for sending a shielded message from a fob 12 to a vehicle 14 to unlock a vehicle door. The process 800 begins in a block 805.

In the block 805, a proximity detection system detects the fob 12 near the vehicle 14. The proximity detection system may, for example, be a passive detection system wherein a first transmitter in the vehicle 14 transmits a signal to determine if a fob 12 is near the vehicle 14. A strength of the transmitted signal may be selected, for example, to be receivable by a fob 12 within one meter of the vehicle 14. The fob 12 may receive the signal and respond, indicating that the fob 12 received the signal.

As another example, a first receiver in the vehicle 14 may receive a transmission from the fob 12, and based on the strength of the transmission signal, determine that the fob 12 is near the vehicle 14. Other known systems for determining that the fob 12 is near the vehicle 14 may be used. When, the vehicle 14 determines that the fob 12 is near the vehicle 14, the process 800 continues in a block 810.

In the block 810, the vehicle 14, based on the determination that the fob 12 is near the vehicle 14, may illuminate a display 62 on the vehicle 14. The display 62 may include, e.g., a plurality of light emitting diodes, arranged in a ring, outlining a target area 65 inside a circumference of the ring. As described above, the target area 65 may include one or more receiver components 41 at a center of the target area 65. The process 800 continues in a block 815.

In the block 815, a shielded communications link is formed between the fob 12 and the vehicle 14. For example, the shielded communications link may be an optical communications link. The fob 12 may include a transceiver 33 including transceiver components 35. The transceiver components 35 may include optical transmitters 35. The optical transmitters 35 may be disposed in a shielded cavity 22 of the fob 12.

In order to form a shielded communications link with the vehicle 14, a user may hold the fob 12 such that the open end of the shield cavity 22 engages the target area 65 of the vehicle 14. In one example, the shielded cavity 22 may be formed in a shield 18 extending from the fob 12. The user may press the open end of the shield 18 against the target area 65 of the vehicle 14, such that a barrier is formed between the shield 18 and an exterior surface of the vehicle 14.

Further, the optical transmission from the fob 12 to the vehicle 14 may be enabled by a switch 34 activated by pressing the shield 18 into the fob 12. As described above, the shield 18 may be slidably supported in a base 16 of the fob 12. The shield 18 may be pressed into the base 16, such that the shield 18 engages the switch 34. In this manner, the action of pressing the fob 12 shield 18 against the target area 65 of the vehicle 14 may be utilized to enable an optical transmission from the fob 12. After forming the shielded communications link, the process 800 continues in a block 820.

In the block 820, the fob 12 and vehicle 14 may optionally perform a handshake operation. For example, the fob 12 and vehicle 14 may be equipped for two-way shielded communications. The fob 12 may transmit a shielded message to the vehicle 14 including fob 12 identification. The vehicle 14 may receive the fob 12 identification message, and determine that the fob 12 is an authorized fob 12. The vehicle 14 may, in response, provide authorization to the fob 12 to transmit an entry code to the vehicle 14. The process 800 continues in a block 825.

In the block 825, the fob 12 sends an entry message to the vehicle 14 via the shielded communications link. The entry message may be, for example, a command for the vehicle 14 to unlock one or more doors. The process 800 continues in a block 830.

In the block 830, the vehicle 14 receives the entry message. The vehicle 14 may, based on receipt of the entry message, unlock one or more doors of the vehicle 14. The vehicle 14 may further, e.g., turn off the display 62. The process 800 may end.

CONCLUSION

The term "exemplary" is used herein in the sense of signifying an example, e.g., a reference to an "exemplary widget" should be read as simply referring to an example of a widget.

In the drawings, the same reference numbers indicate the same elements. Further, some or all of these elements could be changed. Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

The invention claimed is:

1. A system comprising:
   a vehicle receiver;
   a fob including:
      a shield defining a shield cavity; and
      a transmitter located within the shield cavity, the transmitter configured to send signals to the vehicle receiver;
   wherein the shield cavity is shielded to direct signals transmitted by the transmitter toward the vehicle receiver when the fob engages and is pushed toward the vehicle receiver.

2. The system of claim 1, wherein the fob transmitter includes a light emitting diode.

3. The system of claim 2, wherein the light emitting diode includes at least one of an infrared light emitting diode, a visible light emitting diode and an ultraviolet light emitting diode.

4. The system of claim 1, wherein the vehicle receiver includes a photodiode.

5. The system of claim 1, wherein the fob includes:
   a base defining a base cavity;
   wherein the shield is slidably disposed in and extends from the base cavity.

6. The system of claim 5, wherein the fob further includes a switch disposed in the base cavity and wherein the switch is activated when the shield is pushed into the base cavity.

7. The system of claim 5, further including a spring disposed between the base and the shield, wherein:
   the spring biases the shield away from the switch; and
   pushing the fob toward the vehicle receiver activates the switch.

8. The system of claim 1, further comprising:
   a vehicle display configured to illuminate a target area surrounding the receiver; and
   a proximity detection system configured to activate the display upon detection of the fob near the receiver.

9. The system of claim 8, wherein the fob includes a communication system configured to wirelessly communicate with the proximity detection system.

10. The system of claim 1 further comprising:
    a vehicle transmitter,
    wherein the fob further includes a receiver disposed in the shield cavity and configured to receive messages from the vehicle transmitter.

11. The system of claim 10, wherein the fob includes a computer including a memory and a processor storing instructions executable by the processor such that the computer is programmed to:
    transmit, via the fob transmitter, a first message identifying the fob;
    receive from the vehicle transmitter, a second message authorizing the fob to transmit a vehicle entry code; and
    transmit, via the fob transmitter, a third message including the vehicle entry code.

12. The system of claim 10, further comprising a vehicle computer including a memory and a processor storing instructions executable by the processor such that the computer is programmed to:
    receive, from the fob transmitter, a first message identifying the fob;
    transmit, from the vehicle transmitter, a second message authorizing the fob to transmit a vehicle entry code;
    receive, from the fob transmitter, a third messaging including the vehicle entry code; and
    based at least in part on the third message, send a command to a controller to unlock a vehicle door.

13. A fob comprising:
    a base defining a base cavity;
    a shield disposed in and extending from the base cavity and defining a shield cavity having an inner surface and an open end;
    an optical transmitter disposed in the shield cavity;
    wherein the inner surface of the shield cavity directs radiation from the optical transmitter toward the open end of the shield cavity.

14. The fob of claim 13, further comprising:
    a switch disposed in the base cavity;
    a spring disposed between the base and the shield, the spring biasing the shield away from the switch;
    wherein:
    pushing the shield into the base cavity activates the switch; and
    activating the switch enables transmission by the optical transmitter.

15. The fob of claim 14, further comprising:
    an optical receiver disposed in the shield cavity;
    a computer including a memory and a processor storing instructions executable by the processor such that the computer is programmed to:
        receive an authorization message via the optical receiver;
        transmit a message via the optical transmitter based at least in part upon receipt of the authorization message.

* * * * *